(12) United States Patent
Cardoni (10) Patent No.: US 8,467,898 B2
(45) Date of Patent: Jun. 18, 2013

(54) METHOD AND A DEVICE FOR RECOGNIZING, COLLECTING AND REPOSITIONING OBJECTS

(75) Inventor: Patrizio Cardoni, Bologna (IT)

(73) Assignee: SMV S.r.l., Corridonia (Macerata) (IT)

( * ) Notice: Subject to any disclaimer, the term of this patent is extended or adjusted under 35 U.S.C. 154(b) by 828 days.

(21) Appl. No.: 12/529,257

(22) PCT Filed: Mar. 4, 2008

(86) PCT No.: PCT/IB2008/000476
§ 371 (c)(1),
(2), (4) Date: Aug. 31, 2009

(87) PCT Pub. No.: WO2008/107769
PCT Pub. Date: Sep. 12, 2008

(65) Prior Publication Data
US 2010/0114363 A1 May 6, 2010

(30) Foreign Application Priority Data

Mar. 8, 2007 (IT) .............................. BO2007A0153
Mar. 8, 2007 (IT) .............................. BO2007A0155

(51) Int. Cl.
*G06F 7/00* (2006.01)

(52) U.S. Cl.
USPC ............. 700/218; 360/92.1; 294/106; 422/63

(58) Field of Classification Search
USPC ................................................ 700/218, 214
See application file for complete search history.

(56) References Cited

U.S. PATENT DOCUMENTS 4,984,108 A * 1/1991 Grant et al. .................. 360/92.1
5,661,287 A 8/1997 Schaefer (Continued)

FOREIGN PATENT DOCUMENTS

EP 0537923 A 4/1993
EP 1043642 A 10/2000
EP 1277542 A 1/2003

OTHER PUBLICATIONS

International Search Report.
Connell J.H., "A Behavior-Based Arm Controller", (Dec. 1, 1989) IEEE Transactions on Robotics and Automation, IEEE Inc., New York, US, pp. 784-791.
Visher, D Ed, IEEE: "Cooperating Robot with visual and tactile skills", Proceedings of the International Conference on Robotics and Automation, Los Alamitos, IEEE Comp. Soc. Press, US, vol. conf. 8, May 12, 1992.

*Primary Examiner* — Gene Crawford
*Assistant Examiner* — Kyle Logan
(74) *Attorney, Agent, or Firm* — William J. Sapone; Ware Fressola; Maguire & Barber LLP (57) ABSTRACT

A method for recognizing, collecting and repositioning objects (1) having non-predetermined dimensional characteristics and which are arranged on a support surface (2) is implemented by means of a gripper group (30). The gripper group (30) is mobile in at least a lengthwise direction of movement relative to an object (1) to be handled, a direction of moving towards/away from the object (1), and a direction of adjustment of the height relative to the object (1). The gripper group (30) is controlled by a computerized control unit. The method comprises the following operating stages: a stage of approaching and recognizing an object (1), comprising the approximately-set approach of the gripper group (30) to the object (1), performed with the assistance of positional information stored in the control unit; identification of the outline of the object (1), by perpendicular three-dimensional scanning performed, using sequences of movements of the gripper group (30), by means for gauging punctual distance (50) arranged near at least one finger (35, 36) of the gripper group (30), and by sensor means (55) for detecting the presence of the object (1), which identify the depth of the object and are arranged at the head of the fingers (35, 36); a stage of gripping the object (1); a stage of collection the object (1), comprising operations of lifting and moving the object (1).

34 Claims, 5 Drawing Sheets

U.S. PATENT DOCUMENTS 6,671,574 B1 12/2003 Hashimoto
2003/0233166 A1* 12/2003 Nuebling et al. ............. 700/223
2006/0145494 A1* 7/2006 Nihei et al. ................... 294/106
2007/0258858 A1* 11/2007 Rasnow et al. ................. 422/63

* cited by examiner

METHOD AND A DEVICE FOR RECOGNIZING, COLLECTING AND REPOSITIONING OBJECTS

TECHNICAL FIELD

This invention concerns the technical sector relating to apparatus and devices for the automated handling of objects.

In particular the invention concerns a method for recognizing, collecting and repositioning a variety of objects having different shapes, dimensions, weight and consistency. It also concerns a device which recognizes, collects and (if required) repositions such objects, particularly suited to operating in robotic apparatuses for managing automated shops, stores and the like.

BACKGROUND ART

In the prior art the handling of objects in the industrial or logistics sectors, and also in the automated vending sector, is generally performed by ASR (Automatic Storage and Retrieval) systems, that is, computerized systems for receiving/storing and retrieving/dispensing, which comprise, among other things, robotic units for handling the objects. In the case of large and medium-sized systems, units of this type can be mounted on self-propelled bases, while in small-sized systems they can be made mobile by means of arms which are controlled throughout various degrees of freedom, or by other known means for controlled movement. For example the various types of automatic dispensers designed for vending and renting generally small-sized objects (pharmaceutical products, video cassettes, DVDs and the like) belong to the category of ASR systems for small-sized objects.

In general, ASR system handling devices are based on the following assumptions:
a) the object to be dealt with has a known volume, and possibly possesses a "handling interface", which for example can be a pallet or plastic container having standard dimensions;
b) the storage structures are planned to provide spaces which are compatible with the bulk of the objects to be handled, and if necessary are built to accommodate the handling interface of the objects.

All of the foregoing leads to a high level of rigidity in the design and utilization of the above-mentioned systems, making them unusable in some operating situations, such as for example in the automation of the final stage of the product distribution chain. In these situations the objects to be handled may exhibit a wide variety of shapes, dimensions, weight and consistency. For organizational, practical and often cost-related reasons, the objects cannot be packed in standardized containers which are optimized for handling by the above-mentioned known devices.

An aim of this invention is to provide a method for recognizing, collecting and repositioning objects, which is capable of identifying objects of any type within a wide range of dimensions, weight and consistency in terms of rigidity or softness to gripping, and further providing safe modalities for lifting them from an initial location and transporting them towards a new location.

A further aim of the invention is to provide a device for recognizing, collecting and repositioning the above-mentioned objects which is capable of implementing the method described above over a wide range of variability, independently of the shape, weight and consistency of the objects.

A further aim of the invention is to provide a method and a device which allow the use of conventional storage shelving, without restrictions of shape or dimension.

A further aim of the invention is to provide a device which can accurately explore the spaces available for storing products, and store this information in order subsequently to manage the ordering of the products optimally.

A further aim of the invention is to provide a group in the device which prevents an object which is being handled by the device from falling, or even only from downwardly slipping.

A further aim of the invention is to design the anti-fall group in such a way that it can also detect the presence of any slippage of the object to be collected while the object is being lifted by the device, and to supply such information to the processor thereof so that compensatory action can be taken.

DISCLOSURE OF INVENTION

The above-mentioned aims are all achieved, in accordance with the contents of the claims, by a method for identifying, collecting and repositioning objects which comprises the following stages: a stage of approaching, and recognizing, an object having non-predetermined dimensional characteristics which is arranged on a support surface, during which stage the object is approached by an approximately-set mobile gripper group which is provided with means for measuring punctual distance, and the outline of the object is identified by an orthogonal three-dimensional scan performed by the means for measuring punctual distances through programmed movements of the gripper group, and by means for detecting the presence of the object, also provided in the gripper group; a stage in which the object is gripped increasingly tightly by the gripper group until a predetermined intensity of grip is reached; a collection stage, comprising operations of lifting and moving the object; and a stage in which the object is released.

The same aims are also achieved by a device for recognizing, collecting and repositioning objects with non-predetermined dimensional characteristics which comprises: a support; a gripper group, associated to the support and mobile with respect to the support at least in a first direction, further provided with a pair of reciprocally counter-positioned fingers, which are mobile in a second direction and can close and open relative to each other, in order respectively to grip and release an object, which fingers also move together in a third direction, moving closer to/further from the object; punctual distance measuring means, arranged at least one finger of the gripper group, which perform punctual measurements of the distance between the distal end of the relative finger and the object, in order to perform an orthogonal three-dimensional scan of the object, in cooperation with suitable sequences of movements of the fingers; means, arranged at the distal end of the fingers, for detecting the presence of the object, which identify the depth of the object; a computerized control unit, which pilots the gripper group and receives and processes information from the means for measuring punctual distances and from the presence detecting means.

BRIEF DESCRIPTION OF THE DRAWINGS

The characteristics of the invention according to the claims below are highlighted in the following detailed description, with reference to the appended tables of drawings, in which:

BEST MODE FOR CARRYING OUT THE INVENTION

Figure 1:
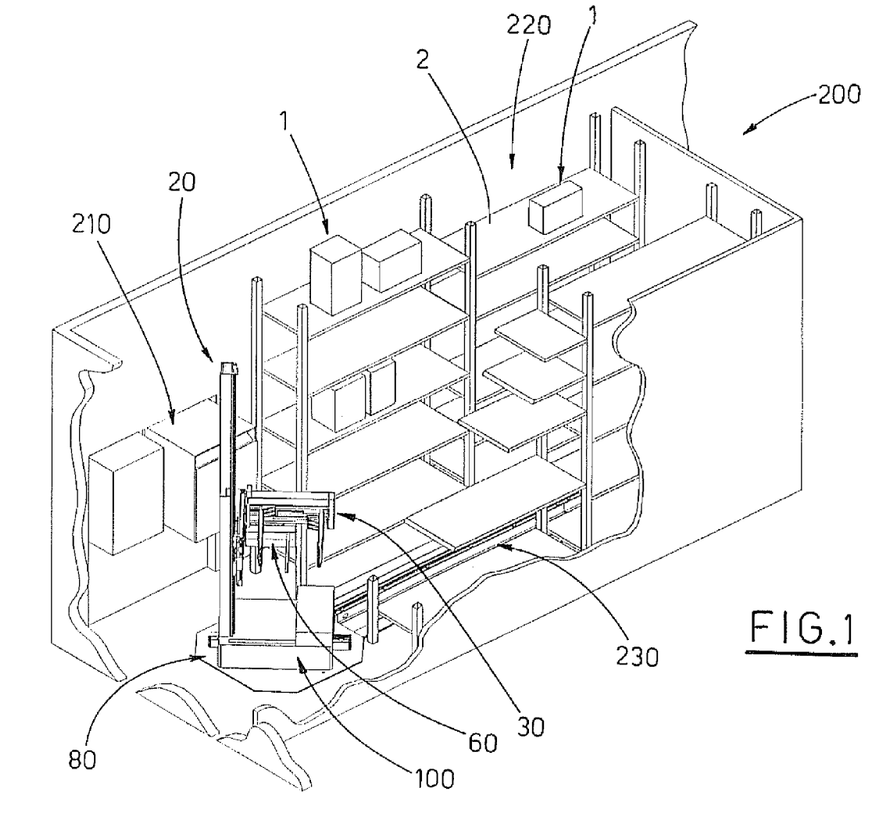
FIG. 1 illustrates a perspective view of an automated vending system comprising the device for identifying, collecting and repositioning objects which implements the method of this invention.
Figure 2:
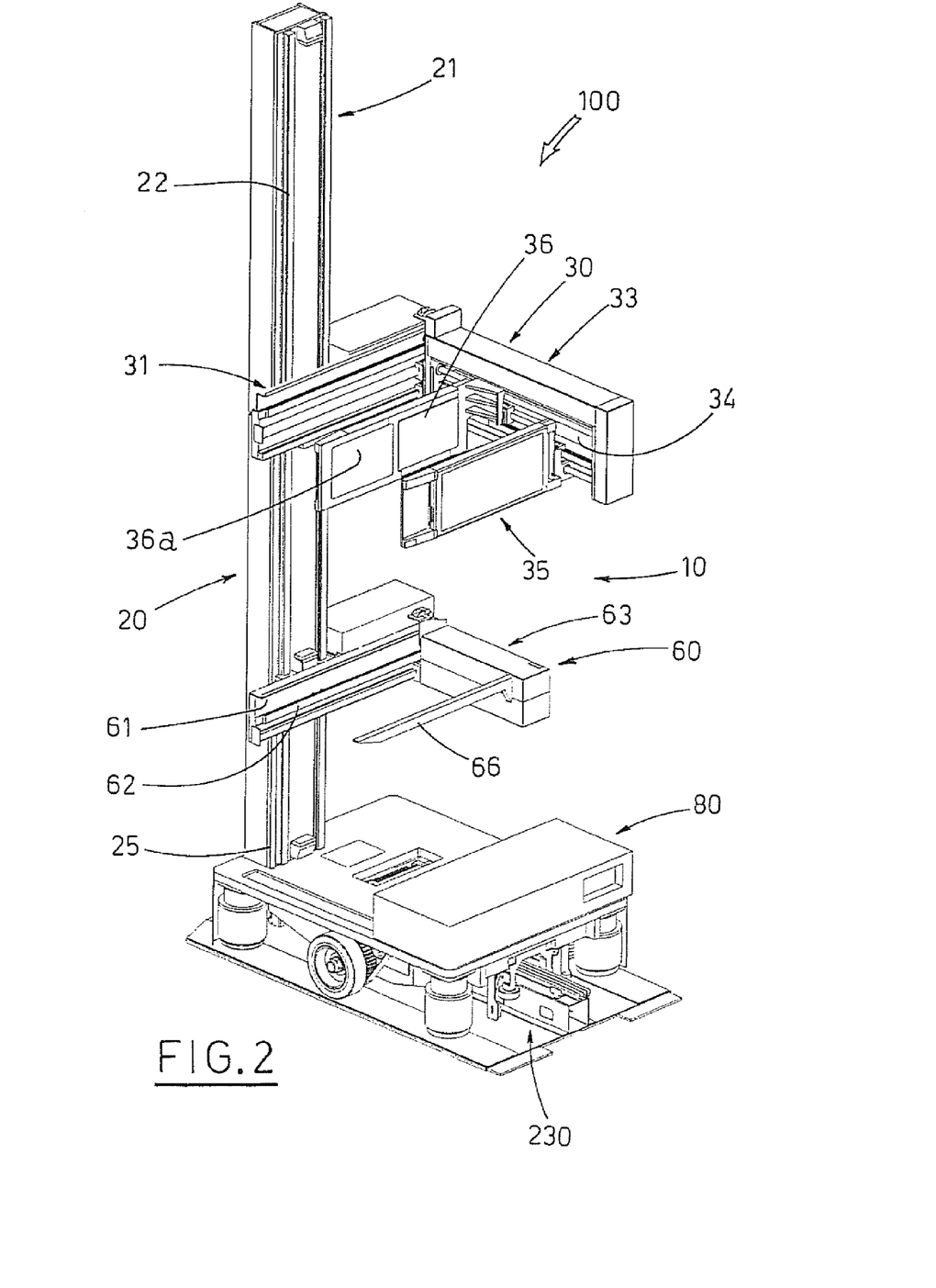
FIG. 2 illustrates a perspective view of a mobile unit for handling and transporting which is part of the system in FIG. 1 and includes the aforementioned device for identifying, collecting and repositioning objects.

In FIGS. 1 and 2, the number 100 refers to a mobile robotic handling and transporting unit for managing a plurality of objects 1, for example in an automated shop 200 or in an automated store. A device for recognizing, collecting and repositioning objects 10 implemented according to this invention is installed in the handling and transporting unit 100.

By way of example, reference will be made herein below to use of the device 10 in an automated shop 200. FIG. 1 shows a possible configuration of such a shop, constituted by a unit 210 for dispensing and receiving the objects 1, by a suitably arranged shelving structure 220, based on the space available and the possibilities of movement of the handling and transporting 100 unit, and by a system of guides 230 of the monorail type of the handling and transporting units 100, extending longitudinally with respect to the extension of the shelving 220. The example of configuration illustrated in FIG. 1 is intentionally rather simple, but the shelving structure 220, and consequently the arrangement of the guide system 230 can, in relation to the size and the layout of the premises where they are installed, be much more complex and articulated, extending to a number of rows which are parallel to, or diverge from each other, or extend in a grid shape.

Generally speaking however, one monorail guide element 230 will be parallel to each linear shelving structure 220, with connecting devices between the different elements to enable the handling and transporting units 100 to move over the entire area of the shop or store.

The shelving 220 exhibits support surfaces 2 for the objects 1, defining a series of housings with different heights, which optimally receive objects 1 having differing bulk, rigidity and weight.

The handling and transporting units 100 (see also FIG. 2) comprise a computer-controlled self-stabilizing mobile base 80, which allows the unit 100 access to all the support surfaces 2 of the store and to the receiving and dispensing unit 210. The structure of this base 80, together with the structure and conformation of the monorail guide system 230 upon which the base moves, are the subject of separate patent protection, and are described in detail in a corresponding patent application, filed by the same Applicant.

The locating of the objects 1 on the relative support surfaces 2, together with general positional information about the objects and strategies for managing the supply of stock to the store and the sale of the objects, are managed by an external computer on the basis of substantially known modalities and techniques, and which in any case go beyond the ambit of this invention.

The device 10 substantially comprises a support 20, which extends mainly vertically, and is constituted by a column element 21, which is inferiorly constrained to the mobile base 80. The column element 21 affords a linear guide 22 preferably of the recirculating ball type.

A mobile gripper group 30, which is mounted on the vertical element 21, slides in a first vertical direction of adjustment of the height of the group 30 relative to the support surfaces 2 of the objects 1. The gripper group 30 performs the operations of recognizing and collecting the objects 1 to be dealt with. In particular, the mobile gripper group 30 travels between extreme lower and upper positions which enable it to reach all the support surfaces 2 of the shelving 220, in ways which will be described in detail herein below.

In turn, the gripper group 30 comprises a sliding bracket 31 which is arranged horizontally and mounted on the vertical element 21 perpendicularly to the direction of longitudinal travel of the base 80, which direction in this case coincides with a second direction of travel of the gripper group 30, such that it is perpendicular to the extension of the shelving 220.

A support body 33 is mounted on a linear guide of the recirculating ball type provided on the sliding bracket 31, is perpendicular to the sliding bracket 31, and slides in a third direction of travel of the gripper group 30, which third direction in this case coincides with a direction of the support body 33 moving closer to/further from the support surfaces 2 and the objects 1 present in them.

The support body 33 is constituted by a box-like element provided, on the surface facing the support surfaces 2, with a prismatic linear guide 34, also in this case preferably of the recirculating ball type.

A pair of gripping fingers 35, 36 are mounted on the support body 33, which are parallel to each other and perpendicular to the support body 33 and which slide on the linear guide 34. The gripping fingers 35, 36 are made reciprocally mobile by means of position and torque controlled motors, for example brushless motors, and by means of a recirculating ball double screw mechanism, with oppositely directed linear motion, in such a way as to move the fingers 35, 36 closer to/further from each other.

This opening/closing motion enables the fingers 35, 36 to grip or release an object 1 to be moved. The travel of the fingers can be performed symmetrically, that is, with both fingers moving closer to or further from each other, or in other suitable modalities, for example keeping one finger stationary and moving the other relative to the first.

The gripper fingers also move together, with the support body 33, into the above-mentioned third direction of moving closer to/away from the object 1.

For the sake of brevity and simplicity, the mechanics of the motion of the gripper group 30 will not be further detailed, since they are realizing using techniques and devices which are part of the background technical expertise of any designer with average experience in the sector.

The gripper group 30 is controlled, via the aforementioned motors of the fingers 35, 36 and suitable position-controllable motors of the support body 33 and of the sliding bracket 31, by a computerized control unit, not visible in the figures, which is housed in the mobile base 80.

Each finger 35, 36 is provided (see FIGS. 3 to 8), at an internal surface thereof, with a oscillating rod 350, pivoted at the central portion of the relative finger 35, 36.

In particular (FIGS. 7 and 8), the oscillating rod 350 comprises an outer arm 351 and an inner arm 352, which oscillate respectively in the distal and proximal portions of the relative finger 35, 36. In its rest position, a pressure-loaded coil spring 354, which is provided between the inner arm 352 of the oscillating rod and the relative proximal portion of the finger 35, 36, keeps the outer arm 351 pushed towards the distal portion of the finger 35, 36.

Figure 7:
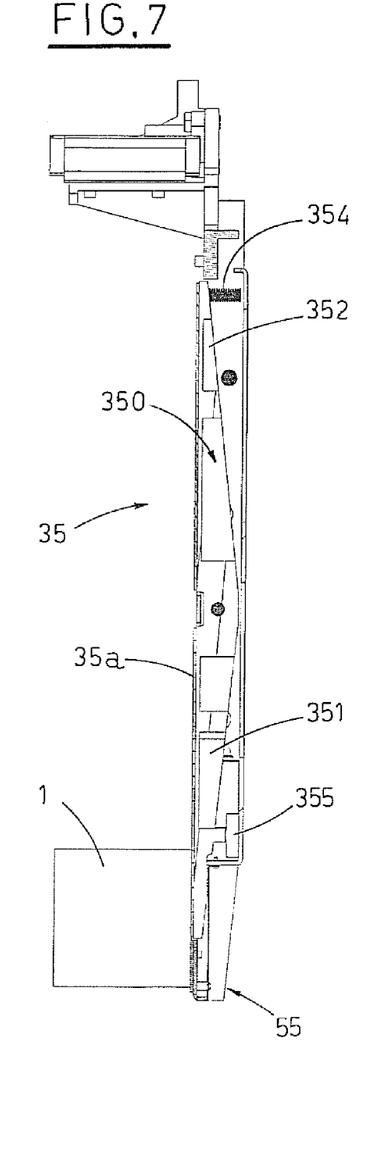
FIG. 7 illustrates a view from above of the finger of FIG. 3 in a gripping condition of a small object.
Figure 8:
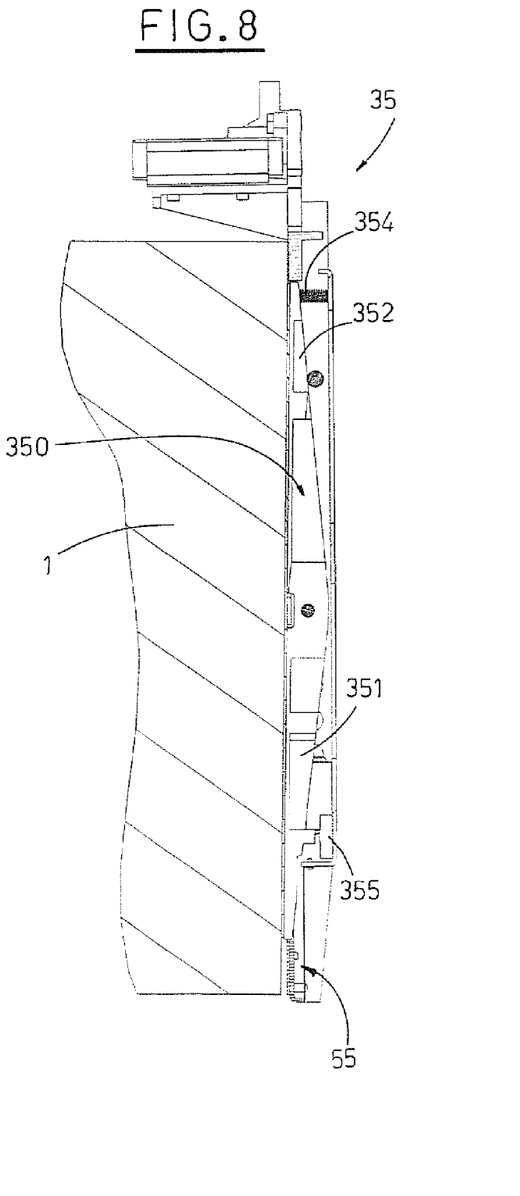
FIG. 8 illustrates a view from above of the finger of finger 3 in a gripping condition of a large object.

The oscillating rods 350 mainly perform two functions, which are independent to each other and performed for objects having differing dimensions. In the first place, when gripping large, for example box-shaped objects, the operation of the fingers 35, 36 performed by the proximal end of the fingers 35, 36 would tend, in the absence of oscillating rods, to mechanically deform the fingers by spreading them, thus reducing the contact surface between the fingers and the object to be lifted. The presence of the oscillating rod 350 makes it possible to compensate for this tendency.

Between the distal portion of the finger 35, 36 and the outer arm 351, further load gauging organs 355 are interposed, which detect the pressure exerted by the corresponding finger 35, 36 on objects 1 of small dimensions. In particular, these load gauging organs 355 are constituted by a miniaturized load cell, of a commercially available type, which is connected electrically with the control unit.

Given the structure of the oscillating rod 350 described above, the load cell 355 is preloaded with a load defined by the action of the coil spring 354.

Figures 3, 5:
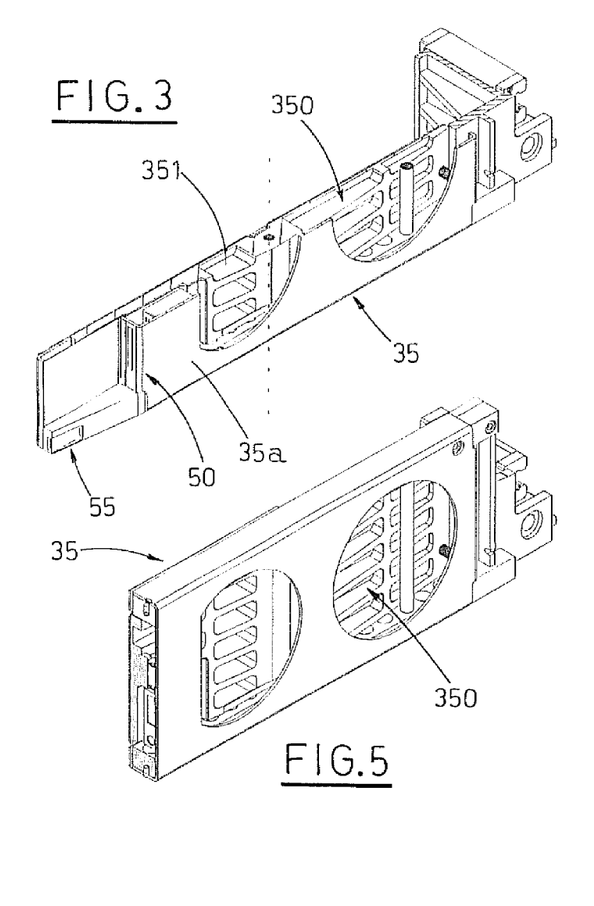
FIG. 3 illustrates a partially cutaway perspective view of a finger of the mobile gripper device belonging to the identification device.
FIG. 5 illustrates a perspective view of a portion of the finger of FIG. 3.
Figure 4:
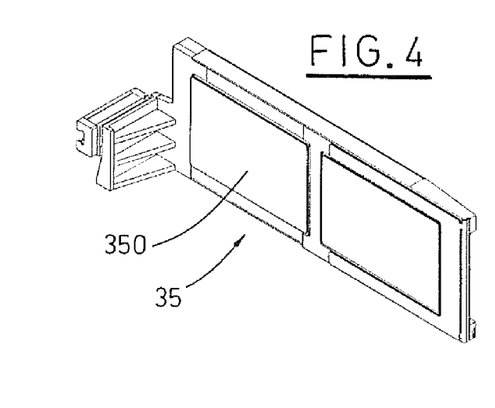
FIG. 4 illustrates a perspective view of the finger of FIG. 3, viewed from a different angle.
Figure 6:
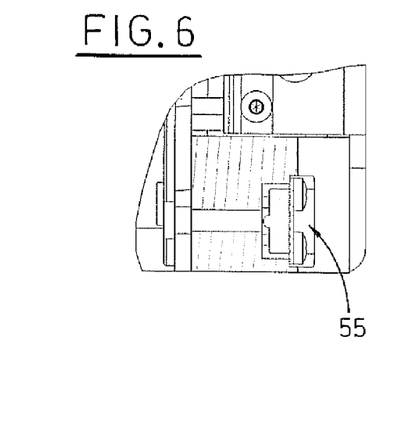
FIG. 6 illustrates a section view of a detail of the finger of FIG. 3.

Punctual distance gauging means 50 mounted in the distal portion of the fingers 35, 36 perform punctual measurements of the distance between the distal end of the corresponding finger 35, 36 and an object 1 to be analyzed.

The gauging means 50 are electrically connected to the control unit and are destined, in cooperation with suitable sequences of movements of the fingers 35, 36 and of the entire gripper group 30, to detect the distance of a series of predetermined points of the object 1 and transmitting them to the control unit. These predetermined points can be for example arranged in a grid with sufficient density, or calculated by means of algorithms to optimize the trajectories of the fingers 35, 36 and to minimize the number of points which are sufficient to identify the shape of the object. The structure of the algorithms, if present, goes beyond the aims of the invention, and will therefore not be explored in depth.

In this way, by means of processing performed by a program which is resident in the control unit, it is possible to perform an orthogonal three-dimensional scan of the object 1 to be analyzed and acquire accurate information relative to the shape of the object 1.

The abovementioned gauging means 50 are preferably present on both fingers 35, 36 of the gripper group 30, and comprise a light laser beam emitter, which emits the laser beam in the direction of the object 1, and a relative sensitive element, which is offset relative to the emitter and which receives the echo of the laser beam reflected by the object 1, in order to enable the distance to be gauged using triangulation techniques. The laser emitter and the sensitive element are devices which are commonly available on the market. The sensitive element can equally be for example a CCD type sensor, a CMOS sensor or other available type.

At the distal end of the fingers 35, 36, sensors 55 of the presence of the object 1 are provided, which are electrically connected to the control unit and which can signal the interposition of at least a part of the object between the fingers 35, 36. The sensors 55 provide the control unit with information relative to the depth of the object to be collected.

The presence sensors means 55 comprise in particular a photoelectric emitter and a relative receiver, which are arranged facing each other on the inner part of the distal ends of the inner surfaces 35a, 36a of the fingers 35, 36.

Figure 9:
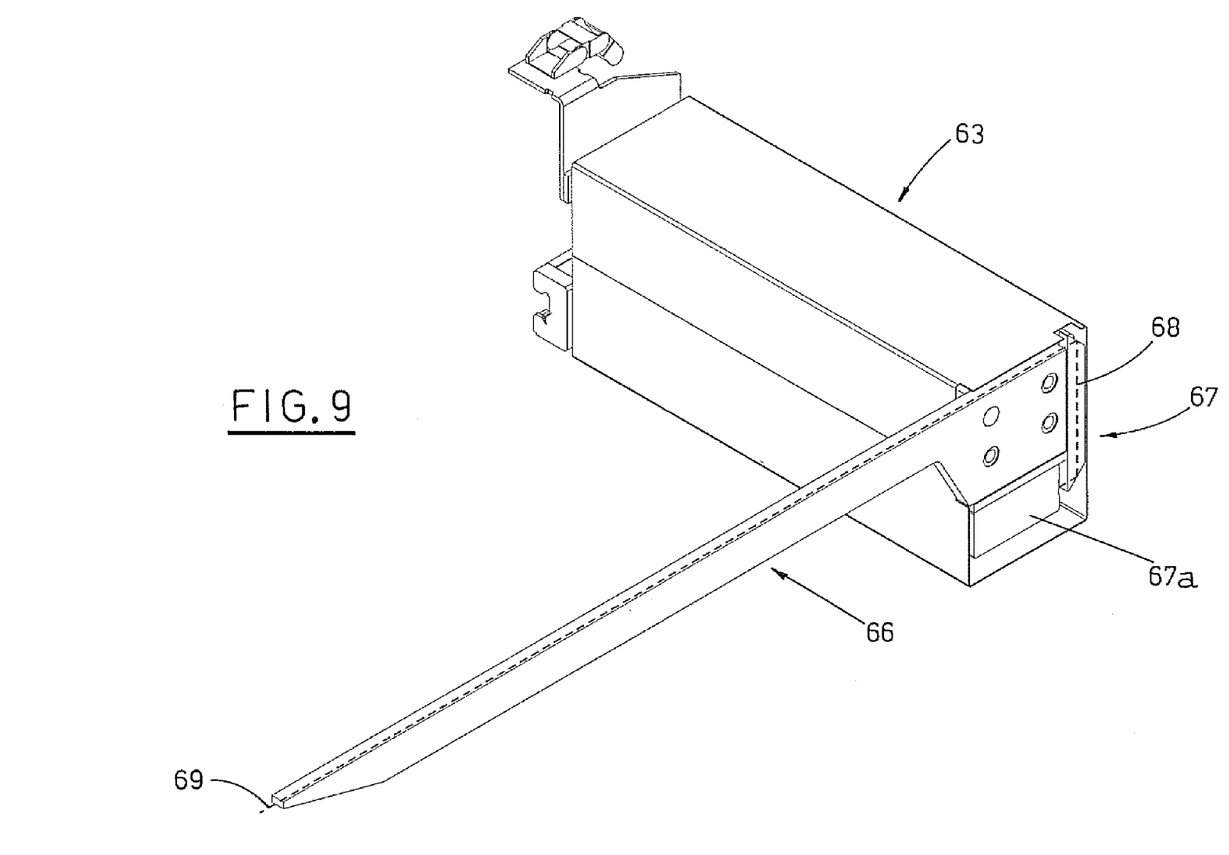
FIG. 9 illustrates a perspective view of an anti-fall group belonging to the identifying, collecting and repositioning device of this invention.

The device 10 further comprises a mobile stability control group 60, which is vertically slidably mounted on the support 20, below the gripper group 30, and which is also activated by the control unit of the handling unit 100. The stability control group 60 prevents an object to be collected from falling and controls it for slippage while the object is being raised by the gripper group 30, in the ways that will be made clear below.

The stability control group 60 comprises, in particular, an anti-fall group 60a, which prevents the falling of an object 1 from the gripper group 30, and anti-slip means 60b, mounted on the anti-fall group 60a, which control slip-free lifting of the object by the gripper group 30.

In particular, the anti-fall group 60a comprises a second sliding bracket 61, which is mounted horizontally to the support 20 and provided with prismatic linear guides 62.

A second support body 63, which is horizontally and cantilevered mounted on the second sliding bracket 61 and substantially parallel to the first support body 32 of the gripper group 30, slides on the guides 62.

On the second support body 62, a horizontally cantilevered anti-fall finger 66 is mounted, which is perpendicular to the second support body 62 and directed towards the objects 1 to be supported. The anti-fall finger 66 can be operated, together with the second support body 62 and in a phase relation with operation of the second gripper group 30, in a nearing direction to the object 1, thus assuming a position immediately below the base of the object to be collected, in order to prevent it from falling.

Sensor means for optical distance measuring 67 are also mounted on the second support body 62, near the anti-fall finger 66, which sensor means are electrically connected to the control unit and are substantially constituted by a laser distance sensor of a commercially available type, and by a prismatic lens 68.

The sensor 67 is thus able to measure the distance between the sensor itself, therefore between the tip of the anti-fall finger 66, and the closest surface which can reflect the laser beam and send the beam back to the sensor.

This distance can be measured using well-known techniques, such as the "flight time" technique, which measures the time the beam takes to travel to and from a target. Measuring devices using this technique in general have a lower resolution than those using, for example, a triangulation measuring technique. However, the field of action is much larger than that permitted by the triangulation technique, and the cost of the device is significantly lower.

The aforementioned device 10 is particularly suited to implementing a method for recognizing, collecting and repositioning objects according to the invention.

An embodiment of this method will be described below with reference to a complete sequence of operating stages relating to locating, recognizing, collecting and releasing an object 1, following its relocating.

This sequence can be performed, both to collect an object arranged on the shelving 220 and position it at the dispensing and receiving unit 210 for subsequent collection by a purchaser, and to collect an object 1 to be stored on the shelving 220 from the dispensing and receiving unit 210, or from another zone of the store suitably provided, in order to reorder a product type or to insert a new one.

The first stage of the method involves approaching and recognizing an object 1. In this stage, the central processor of the automated shop (or store) provides the control unit of the collection unit 10 with approximate positional information about the location of an object 1 to be collected. The handling and transporting unit 100, of which the device 10 is a part and which is usually, although not necessarily, controlled by the same control unit as of the device 10, then moves near the object 1 to be collected. Vertical movement of the gripper group 30 is activated until the gripper group 30 reaches the height of the object 1.

In the next stage, the outline of the object 1 is identified. To this end, the control unit orders the performance of a programmed sequence of movements of the fingers 35, 36 in a longitudinal direction, that is, parallel to the shelving 220, and of the sliding bracket 31 on the support 20 in a vertical direction. In this way a plurality of distance-detecting points is identified, which separate the distal end of the fingers 35, 36 from the object 1 to be collected.

As already described, the various detecting points can be arranged in a grid with sufficiently small step, or they can be defined by means of an algorithm which optimizes the trajectories and minimizes the number of points required to identify the shape of the object. For each point, the laser emitter and the relative sensitive receiver element perform a measurement of the distance by triangulation.

Identification of the three-dimensional outline of at least the visible part of the object 1 is performed by a suitable program running on the control unit, which identifies the edges of the object by means of the sudden increase in the distance value which is read near the detecting points which go beyond the outline of the object.

A three-dimensional scan performed in this way, that is by perpendicular movements of the fingers 35, 36 and of the entire gripper group 30, enables extremely accurate information to be obtained about the shape of the object 1, without the measuring alterations and complexity of implementation which are typical of conventional three-dimensional scanning systems, which generally use deflection devices and a spherical scanning method.

In a further step of the stage for identifying the outline of the object 1, the overall depth of the object is detected, which obviously cannot be measured by the laser emitter and the relative receiver. To this end the fingers 35, 36, located in a position which is sufficiently open to embrace the lateral outline of the object 1, advance towards the object until the front part of the object 1 is interposed between the photoelectric transmitter and the receiver of the presence sensor 55. The fingers 35, 36 are advanced still further, until the optical signal of the transmitter again reaches the receiver. At this point the object to be collected is entirely surrounded by the fingers 35, 36.

In the subsequent stage of gripping the object 1, the fingers 35, 36 progressively move closer to the object until they make contact there-with. If the object is small, contact with the fingers 35, 36 takes place at the outer arms 351 of the oscillating rods 350. As the fingers 35, 36 tighten their grip, the pressure exerted by the outer arms 351 on the corresponding load cells 355 increases. Tightening is interrupted when a predetermined pressure is reached, which depends on several factors. Firstly, it depends on the weight of the object, information about which is present in the control unit, either because it was entered by an operator when the object was introduced to the assortment in the store, or because it is acquired by a suitable instrument present in the dispensing and receiving unit 210. Secondly, the maximum pressure depends on characteristics peculiar to the object, such as the delicateness of the packing. This information can also be supplied to the control unit.

When the predetermined pressure, which is measured as the increase in pressure on the load cell 355, has been reached, the control unit stops the gripping fingers 35, 36 and orders a first lifting of the gripper group 30.

With large objects, as emphasized herein above, contact takes place substantially on the entire inner surface of the fingers 35, 36, because of the presence of the oscillating rods 350. This causes discharge of the pressure on the load cell 355, which is detected by the control unit.

In this case, the control unit directly controls the intensity of the grip by reading the value of the current feedback signal of the brushless motor operating the gripping fingers 35, 36. This reading is preferably performed by processing the current feedback signal by means of a suitable state estimation filter such as a Kalman filter, implemented in the management program of the control unit.

Subsequently the control unit positions the anti-fall group 60a in a position immediately below the base of the object 1. This is achieved by measuring the distance of the object 1 with the laser sensor 67, and detecting the sudden distance variation which takes place at the lower edge of the object.

The operation of lifting the object 1 comprises a subsequent initial lifting stage of the object 1, performed by vertical sliding of the gripper group 30. At the same time, the anti-fall group 60a is operated in such a way that the anti-fall finger 66 is always maintained immediately below the lower edge of the object. This is achieved by positioning the anti-fall group 60a in such a way that the laser beam emitted by the sensor 67 illuminates a zone immediately below the lower edge of the object 1. During the lifting stage of the gripper group 30, the anti-fall group 60a is raised by the same amount. If the object 1 starts to slip from the grip of the gripper group 30, its lower edge will be intercepted by the laser beam 67, thus causing a significant variation in the flight time required by the laser beam to return to the sensor 67. In this case, the control unit will again try to find the lower edge of the object.

In this way, if the object starts downwardly sliding, the control unit detects it by controlling the height difference between the gripper group 30 and the anti-fall group 60a. If this difference varies significantly, the control unit can decide whether to increase the gripping intensity of the gripping fingers 35, 36, or to abort the lifting operation.

If no slipping occurs, when the predetermined initial lifting height is reached, the second support body 63 slides closer to the object 1, until the anti-fall finger 66 is inserted under the base of the object 1, thus stabilizing its position and preventing it from falling.

At this point the object 1 can be raised further if necessary, and then transported towards a new position.

The final release stage naturally comprises reaching a slightly higher raised position at the release station, a first disengagement operation of the anti-fall finger 66, a further lowering of the gripper group 30 until contact is made by the object with the new support surface 2 and the opening of the gripping fingers 35, 36 until they are disengaged from the object.

A possible additional use of the capability, possessed by the assembly formed by the gripper group and the punctual distance measuring system, to perform an accurate and geometrically correct spatial scan, consists of the further initial self-instruction function regarding the shape and size of the shelving spaces, when empty. This makes it possible to implement completely automated management of the ordering of the objects in the shop, store or the like by the computer, thus enabling the arrangement of several objects one above the other, if the mechanical characteristics of the objects allow this.

An advantage provided by this invention consists of enabling objects of any type within a wide range of dimensions, weight and consistency in terms of rigidity or softness to gripping to be identified, and further of providing safe modalities for lifting the objects from an original location and their transport to a new location.

A further advantage consists of the possibility of managing storage spaces which are not predefined, which are for example fitted with conventional shelving having housings of one or more standardized dimensions.

A still further advantage of the invention consists in the ability of the device to identify, collect and reposition, to exploit the spaces of the shelving optimally, if necessary stacking the objects one upon the other, if sufficient space is available. This capability is provided by the characteristics of autonomous estimation of the spaces which are provided by the three-dimensional scanning system described in the device of the invention.

An advantage provided by this invention consists in making it possible to safely move and transport the objects to be handled, without the risk of falls during transporting which could compromise the integrity of the objects, hinder continuation of the operations of managing the shop or store, and even damage the handling unit 100.

A further advantage is constituted by the fact that it is possible to control and compensate for even the slightest initial slips, which do not yet involve the loss of contact of the gripper group with the object.

The above is described purely by way of non-limiting example. Therefore, any possible modifications and variants of the invention are considered to fall within the ambit of protection of the technical solution as it is described herein above and in the following claims.

The invention claimed is:

1. A method for recognizing, collecting and repositioning objects, which objects (1) exhibit non-predetermined dimensional characteristics, said method comprising the steps of:
   providing a gripper group (30) having fingers, the gripper group being movable in at least a longitudinal direction relative to an object (1) to be handled, a direction towards/away from the object (1), and a direction of height adjustment relative to the object (1),
   controlling the gripper group (30) using a computerized control unit, said method further comprising any suitable combination of the following operating steps:
   directing the gripper group to approach the object (1) using positional information stored in the control unit;
   performing a perpendicular three-dimensional scanning for recognizing an outline of the object using sequences of displacements of the gripper unit (30) by gauging punctual distances (50), using a gauge arranged on at least one finger (35, 36) of the gripper group (30);
   providing a presence sensor (55) for detecting a depth of the object, and arranging the presence sensor (55) at a top of the fingers (35, 36) of the gripper group (30);
   gripping the object (1) using the gripper group (30), and progressively tightening the gripper group (30) for gripping the object (1) until a predetermined intensity of grip is reached, said predetermined grip intensity depending on physical characteristics of the object (1);
   collecting the object (1) by lifting and moving the object (1);
   directing the gripper group (30) to approach a support surface (2);
   moving the gripper group (30) until the object (1) makes contact with the support surface (2);
   opening the fingers (35, 36) of the gripper group (30) until the object (1) is released and extracting the fingers (35, 36) from where the object (1) is located; and
   wherein at least one finger of the gripping group has at least one oscillating rod (350) provided on an inner surface thereof, and gripping the object by the gripping fingers (35, 36) with interpositioning of the at least one oscillating rod (350).

2. The method of claim 1, wherein the performing of the perpendicular three-dimensional scanning for recognizing the outline of the object comprises the steps of:
   acquiring a set of punctual distance data regarding the object (1) by positioning the gauge on various points of data acquisition of the object, by moving the fingers (35, 36) of the gripper unit (30) along trajectories controlled by the control unit, and processing the set of punctual distance data using the control unit to obtain the dimensional outline of the object and a distance of the object from the gripper group (30).

3. The method of claim 1, wherein the presence sensor acquires data regarding a depth of the object (1), by determining a presence or absence of a signal which is transmitted and received respectively by a transmitter and a receiver belonging to the presence sensor (55).

4. The method of claim 3, characterized in that the signal is a light signal.

5. The method of claim 1, wherein at least one oscillating rod (350) is provided for each finger (35, 36).

6. The method of claim 1, further comprising, during gripping of the object (1) by the gripping fingers (35, 36), controlling the intensity of the grip in one of at least two different ways, depending on the dimensions of the object (1).

7. The method of claim 6, characterized in that, when gripping objects (1) of large dimensions, grip intensity is controlled by reading a value of a current feedback signal of a motor activating the gripper fingers (35, 36).

8. The method of claim 6, characterized in that, when gripping objects of small dimensions, grip intensity is controlled by reading a pressure exerted on the object (1) by the fingers, the reading obtained using a load gauge (355) arranged at a distal portion of at least one of the gripper fingers (35, 36).

9. The method of claim 8, further comprising operating the load gauge in conjunction with interpositioning of an outer arm (351) of at least one oscillating rod (350).

10. A method for recognizing, collecting and repositioning objects, which objects (1) exhibit non-predetermined dimensional characteristics, said method comprising the steps of:
   providing a gripper group (30) having fingers, the gripper group being movable in at least a longitudinal direction relative to an object (1) to be handled, a direction towards/away from the object (1), and a direction of height adjustment relative to the object (1),
   controlling the gripper group (30) using a computerized control unit, said method further comprising any suitable combination of the following operating steps:
   directing the gripper group to approach the object (1) using positional information stored in the control unit;
   performing a perpendicular three-dimensional scanning for recognizing an outline of the object using sequences of displacements of the gripper unit (30) by gauging punctual distances (50), using a gauge arranged on at least one finger (35, 36) of the gripper group (30);
   providing a presence sensor (55) for detecting a depth of the object, and arranging the presence sensor (55) at a top of the fingers (35, 36) of the gripper group (30);

gripping the object (1) using the gripper group (30), and progressively tightening the gripper group (30) for gripping the object (1) until a predetermined intensity of grip is reached, said predetermined grip intensity depending on physical characteristics of the object (1);

collecting the object (1) by lifting and moving the object (1);

directing the gripper group (30) to approach a support surface (2);

moving the gripper group (30) until the object (1) makes contact with the support surface (2);

opening the fingers (35, 36) of the gripper group (30) until the object (1) is released and extracting the fingers (35, 36) from where the object (1) is located;

wherein the performing of the perpendicular three-dimensional scanning for recognizing the outline of the object comprises the steps of:

acquiring a set of punctual distance data regarding the object (1) by positioning the gauge on various points of data acquisition of the object, by moving the fingers (35, 36) of the gripper unit (30) along trajectories controlled by the control unit, and processing the set of punctual distance data using the control unit to obtain the dimensional outline of the object and a distance of the object from the gripper group (30); and, wherein the points of acquisition are organized in a grid having a predefined step.

11. A method for recognizing, collecting and repositioning objects, which objects (1) exhibit non-predetermined dimensional characteristics, said method comprising the steps of:

providing a gripper group (30) having fingers, the gripper group being movable in at least a longitudinal direction relative to an object (1) to be handled, a direction towards/away from the object (1), and a direction of height adjustment relative to the object (1), controlling the gripper group (30) using a computerized control unit, said method further comprising any suitable combination of the following operating steps:

directing the gripper group to approach the object (1) using positional information stored in the control unit;

performing a perpendicular three-dimensional scanning for recognizing an outline of the object using sequences of displacements of the gripper unit (30) by gauging punctual distances (50), using a gauge arranged on at least one finger (35, 36) of the gripper group (30);

providing a presence sensor (55) for detecting a depth of the object, and arranging the presence sensor (55) at a top of the fingers (35, 36) of the gripper group (30);

gripping the object (1) using the gripper group (30), and progressively tightening the gripper group (30) for gripping the object (1) until a predetermined intensity of grip is reached, said predetermined grip intensity depending on physical characteristics of the object (1);

collecting the object (1) by lifting and moving the object (1);

directing the gripper group (30) to approach a support surface (2);

moving the gripper group (30) until the object (1) makes contact with the support surface (2);

opening the fingers (35, 36) of the gripper group (30) until the object (1) is released and extracting the fingers (35, 36) from where the object (1) is located, and providing an initial lifting stage of the object (1) by the gripper group (30), and controlling slippage of the object (1) during the lifting stage by arranging a mobile anti-fall support arrangement (60) below the gripper group (30).

12. The method of claim 11, further comprising moving the anti-fall support arrangement (60) independently of the movement of the gripper unit (30).

13. The method of claim 11, wherein the directing of the gripper unit to approach the support surface (2) comprises the steps of first moving of the object (1) to a raised position above the support surface (2), and subsequently withdrawing the anti-fall support arrangement (60) from below a base of the object (1).

14. A device for recognizing, collecting and repositioning objects, which objects exhibit non-predetermined dimensional characteristics, the device (10) being movable with degrees of freedom corresponding to at least a direction of longitudinal movement with respect to an object (1), a direction of movement towards/away from the object (1), and a direction of adjustment of a height relative to the object (1), the device (10) also being controlled by a computerized control unit, the device comprising:

a support (20);

a mobile gripper group (30), associated to the support and movable relative to the support in at least a first direction, the gripper group (30) being provided with at least a pair of fingers (35, 36) positioned facing one another, the fingers being movable in a second direction, and adapted for opening and closing with respect to one another in order respectively to grip and release an object (1), the fingers (35, 36) being movable together in a third direction towards/away from the object (1);

a measuring device (50) for measuring a punctual distance, arranged relative to at least one finger of the gripper group (30) for performing punctual gauging of a distance between a distal end of the at least one finger (35) and the object (1), suitable sequences of movements of the fingers (35, 36) used for performing an orthogonal three-dimensional scan of the object (1);

a presence sensor (55) for detecting a presence of the object (1), and for identifying a depth of the object (1), the presence sensor being arranged at distal ends of the fingers (35, 36);

a computerized control unit for directing movement of the gripper group (30) and for processing information received from the measuring device (50) and the presence sensor (55); and, wherein each finger (35, 36) has an oscillating rod (350), arranged on an inner surface of the relative finger (35, 36) and being pivoted at a central portion of the finger (35, 36), the oscillating rod (350) being adapted for facilitating gripping of objects (1) having widely differing dimensions.

15. The device of claim 14, wherein the presence sensor (55) has a photoelectric emitter and a relative receiver, which are arranged facing each other on distal ends of the inner surfaces (35a, 36a) of the fingers (35, 36).

16. The device of claim 14, characterized in that the support (20) comprises a vertical column element (21), which slidingly supports the gripper group (30), and that the first direction of movement defined by the support (20) coincides with a height adjustment direction of the gripper group (30).

17. The device of claim 16, characterized in that the vertical column element (21) is provided with guides (22) of recirculating ball type.

18. The device of claim 14, characterized in that the gripper group (30) comprises a support body (33) for supporting the fingers (35, 36), the support body being slidingly cantilever mounted on a sliding bracket (31) in the third direction of moving towards/away, the sliding bracket (31) being in turn slidingly mounted on the support (20) in the first direction of height adjustment.

19. The device of claim 18 wherein the sliding bracket (31) is mounted on the support (20) in a horizontal position and parallel to the support (20), the support body being mounted in a horizontal position and perpendicular to the sliding bracket (31), the fingers (35, 36) being mounted perpendicularly to the sliding bracket and being mutually parallel.

20. The device of claim 14, characterized in that at least one finger (35, 36) is provided with a load gauge (355), arranged in a distal portion of the finger (35, 36) for detecting a pressure exerted by the finger (35, 36) on small objects (1).

21. The device of claim 20 wherein the load gauge is a miniaturized load cell.

22. The device of claim 20, wherein the load gauge is activated by an interpositioning of an outer arm (351) of the oscillating rod (350).

23. The device of claim 14, characterized in that the measuring device comprises at least one emitter of a laser beam, which emits the beam towards the object (1), and a relative sensitive element which receives an echo of the laser beam reflected by the object (1).

24. The device of claim 23, characterized in that a laser emitter and a relative sensitive element are provided on each gripper finger (35, 36).

25. The device of claim 14, wherein the device is mounted, at a lower end (25) of the support (20), on a mobile and self-stabilizing base (80) which is controlled by a processor and which operates as a robotic mobile handling and transporting unit in order to manage the objects (1) in an automated shop or store (200).

26. A device for recognizing, collecting and repositioning objects, which objects exhibit non-predetermined dimensional characteristics, the device (10) being movable with degrees of freedom corresponding to at least a direction of longitudinal movement with respect to an object (1), a direction of movement towards/away from the object (1), and a direction of adjustment of a height relative to the object (1), the device (10) also being controlled by a computerized control unit, the device comprising:
  a support (20);
  a mobile gripper group (30), associated to the support and movable relative to the support in at least a first direction, the gripper group (30) being provided with at least a pair of fingers (35, 36) positioned facing one another, the fingers being movable in a second direction, and adapted for opening and closing with respect to one another in order respectively to grip and release an object (1), the fingers (35, 36) being movable together in a third direction towards/away from the object (1);
  a measuring device (50) for measuring a punctual distance, arranged relative to at least one finger of the gripper group (30) for performing punctual gauging of a distance between a distal end of the at least one finger (35) and the object (1), suitable sequences of movements of the fingers (35, 36) used for performing an orthogonal three-dimensional scan of the object (1);
  a presence sensor (55) for detecting a presence of the object (1), and for identifying a depth of the object (1), the presence sensor being arranged at distal ends of the fingers (35, 36);
  a computerized control unit for directing movement of the gripper group (30) and for processing information received from the measuring device (50) and the presence sensor (55); and,
  an anti-fall group, mounted on the support (20), below the gripper group (30) for preventing an object (1) from falling, and an anti-slip arrangement (60b), mounted on the anti-fall group (60a) for assuring that the object is lifted without any slippage relative to the gripper group (30).

27. The device of claim 26, characterized in that the anti-fall group is slidingly mounted on the support (20).

28. The device of claim 27, characterized in that the anti-fall group comprises:
  a second sliding bracket (61), horizontally mounted on the support (20) and provided with guides (62);
  a second support body (63) horizontally cantilever mounted on the second sliding bracket (61) and sliding in the guides (62):
  an anti-fall finger (66), which is horizontally mounted in the second body support (63) and directed toward the objects (1) to be supported, the anti-fall finger (66) being operable, together with the relative second support body (63) and in a phase relation with the operation of the gripper group (30), so as to be positioned immediately below a base of the object (1).

29. The device of claim 26, characterized in that the anti-fall group comprises:
  a second sliding bracket (61), horizontally mounted on the support (20) and provided with guides (62);
  a second support body (63) horizontally cantilever mounted on the second sliding bracket (61) and sliding in the guides (62):
  an anti-fall finger (66), which is horizontally mounted in the second body support (63) and directed toward the objects (1) to be supported, the anti-fall finger (66) being operatable, together with the relative second support body (63) and in a phase relation with the operation of the gripper group (30), so as to be positioned immediately below a base of the object (1).

30. The device of claim 26, characterized in that the anti-slip arrangement (60b) comprises:
  an optical distance detector (67) electrically connected to the control unit, an optical axis (69) of the optical distance detector (67) being directed toward the object (1), the anti slip arrangement being operated in a phase relation with the operation of the gripper group (30) in such a way as to maintain the optical axis (69) immediately below a lower edge of the object (1).

31. The device of claim 30, characterized in that the optical axis (69) is arranged parallel to, and immediately above, the anti-fall finger (66).

32. The device of claim 30, wherein the optical distance detector (67) comprises a laser distance sensor (67a), which is mounted in the second support body (63) and is provided with a prismatic lens (68), which prismatic lens (68) orients the laser beam emitted by the sensor according to the optical axis (69).

33. The device of claim 32, characterized in that the optical axis (69) is arranged parallel to, and immediately above, the anti-fall finger (66).

34. The device of claim 26, characterized in that, during the first lifting of the object (1), the anti-fall group is maintained at a height which is immediately below the base of the object (1), by raising the anti-fall group which follows a corresponding raising of the gripper group (30), an amount of the raising of the anti-fall group being defined by data relative to any slippage of the object (1) transmitted by the anti-slip arrangement to the control unit.

* * * * *